(12) United States Patent
Chen

(10) Patent No.: US 12,384,086 B2
(45) Date of Patent: Aug. 12, 2025

(54) RUNNER PROTECTION TUBE FOR STEEL CASTING AND MANUFACTURING METHOD THEREOF

(71) Applicant: TEMC METAL & CHEMICAL CORP., Taipei (TW)

(72) Inventor: Jing-Feng Chen, Changhua County (TW)

(73) Assignee: TEMC METAL &CHEMICAL CORP., Taipei (TW)

( * ) Notice: Subject to any disclaimer, the term of this patent is extended or adjusted under 35 U.S.C. 154(b) by 293 days.

(21) Appl. No.: 18/189,205

(22) Filed: Mar. 24, 2023

(65) Prior Publication Data
US 2024/0316851 A1    Sep. 26, 2024

(51) Int. Cl.
| | | |
|---|---|---|
| B29C 48/15 | (2019.01) | |
| B29C 48/00 | (2019.01) | |
| B29C 48/91 | (2019.01) | |
| B29K 1/00 | (2006.01) | |
| B29K 31/00 | (2006.01) | |
| B29K 105/00 | (2006.01) | |
| B29K 105/16 | (2006.01) | |
| B29K 309/02 | (2006.01) | |
| B29L 23/00 | (2006.01) | |

(52) U.S. Cl.
CPC ...... B29C 48/0015 (2019.02); B29C 48/0017 (2019.02); B29C 48/0019 (2019.02); B29C 48/9105 (2019.02); B29C 2791/001 (2013.01); B29C 2791/003 (2013.01); B29C 2948/92438 (2019.02); B29K 2001/08 (2013.01); B29K 2031/04 (2013.01); B29K 2105/0085 (2013.01); B29K 2105/16 (2013.01); B29K 2105/258 (2013.01); B29K 2309/02 (2013.01); B29L 2023/00 (2013.01)

(58) Field of Classification Search
CPC ..... B64C 13/16; B64C 13/503; B64C 13/506; B64C 27/57; B64C 19/00; B64C 27/06; B64D 31/06; B64D 45/00; G01C 23/005; G05D 1/0072; G05D 1/0669; A61K 2039/505; A61K 38/00; B29C 2791/001; B29C 2791/003; B29C 2948/92438; B29C 48/0015; B29C 48/0017; B29C 48/0019; B29C 48/9105; B29K 2001/08; B29K 2031/04; B29K 2105/0085; B29K 2105/16; B29K 2105/258; B29K 2309/02; B29L 2023/00; C07K 14/47; C07K 14/475; G08G 5/21; G08G 5/52; G08G 5/55; Y10S 435/81; Y10S 435/975
See application file for complete search history.

(56) References Cited

U.S. PATENT DOCUMENTS

| | | |
|---|---|---|
| 2009/0014145 A1 | 1/2009 | Stotzel et al. |
| 2009/0211717 A1 | 8/2009 | Takagi et al. |
| 2016/0068440 A1 | 3/2016 | Spangenberg et al. |

FOREIGN PATENT DOCUMENTS

| | | |
|---|---|---|
| CN | 101696093 | 4/2010 |
| CN | 101705356 | 6/2012 |
| CN | 103964873 | 8/2014 |
| CN | 103264142 | 5/2015 |
| CN | 106673599 | 5/2017 |
| CN | 106747522 | 5/2017 |

OTHER PUBLICATIONS

Hirata et al, CN 110785454 (Year: 2022).*
"Search Report of Europe Counterpart Application", issued on May 26, 2023, p. 1-p. 8.

* cited by examiner

*Primary Examiner* — Lawrence D Ferguson
(74) *Attorney, Agent, or Firm* — JCIPRNET

(57) ABSTRACT

The disclosure provides a runner protection tube for steel casting and a manufacturing method thereof. The runner protection tube for steel casting is made of a slurry composition for forming the runner protection tube for steel casting, the slurry composition includes organic fibers, inorganic fibers, thermosetting resins, thermoplastic resins, inorganic particles, inorganic binders, water, a lubricating oil and a hydrating agent.

10 Claims, No Drawings

RUNNER PROTECTION TUBE FOR STEEL CASTING AND MANUFACTURING METHOD THEREOF

BACKGROUND

Technical Field

The present disclosure relates to a protection tube and a manufacturing method thereof, and particularly to a runner protection tube for steel casting and a manufacturing method thereof.

Description of Related Art

A runner protection tube for casting is one of widely used technologies in casting industry. In the prior art, refractory materials such as ceramics are usually used to manufacture casting runner protection tubes. The manufacturing process is to first make a tubular green body, dry it and then fire it at a high temperature to form a refractory ceramic pipe. When using a runner protection tube for casting, bury it in the molding sand to become a channel to enter the cavity. The basic function of the casting runner protection tube is to ensure that sand washing and sticky sand wouldn't happen during the flow process, and the molten material will not stick after cooling. In essence, the casting runner protection tube uses the refractory properties of the material to isolate the molten material from the molding sand, so as to achieve the above purpose. However, there is room for improvement in conventional casting runner protection tubes in terms of refractoriness, strength, water resistance and high temperature stability.

Based on the above, it is an important subject of current research to develop a runner protection tube for steel casting with good refractoriness, strength, water resistance and high temperature stability.

SUMMARY

The disclosure provides a runner protection tube for steel casting and a manufacturing method thereof, and the runner protection tube for steel casting has good refractoriness, strength, water resistance and high temperature stability.

The disclosure provides a runner protection tube for steel casting, which is made of a slurry composition for forming the runner protection tube for steel casting, the slurry composition includes organic fibers, inorganic fibers, thermosetting resins, thermoplastic resins, inorganic particles, inorganic binders, water, a lubricating oil and a hydrating agent.

In an embodiment of the present disclosure, based on a total weight of the slurry composition, an amount of the organic fiber used is 5 wt % to 15 wt %, an amount of the inorganic fiber used is 15 wt % to 25 wt %, an amount of the thermosetting resin is 5 wt % to 15 wt %, an amount of the thermoplastic resin is 1 wt % to 10 wt %, an amount of the inorganic particles is 20 wt % to 40 wt %, an amount of the inorganic binder is 5 wt % to 20 wt %, an amount of water is 15 wt % to 40 wt %, an amount of the lubricating oil is 1 wt % to 10 wt %, and an amount of the hydrating agent is 1 wt % to 10 wt %.

In an embodiment of the present disclosure, the organic fiber includes a pulp.

In an embodiment of the present disclosure, the inorganic fiber includes ceramic fibers.

In an embodiment of the present disclosure, the thermosetting resin includes phenolic resins and a cast starch.

In an embodiment of the present disclosure, the thermoplastic resins include ethylene vinyl acetate copolymer, polyvinyl alcohol or vinyl acetate.

In an embodiment of the present disclosure, the inorganic particles include a bentonite, a kaolin, a zircon powder or a chromite.

In an embodiment of the present disclosure, the inorganic binder includes a sodium silicate.

In an embodiment of the present disclosure, the lubricating oil includes a mineral oil or a castor oil.

In an embodiment of the present disclosure, the hydrating agent includes lignosulfonate.

The disclosure provides a manufacturing method of a runner protection tube for steel casting, including the following steps. Water, organic fibers and inorganic fibers are put into a pulper to prepare a slurry, and putting the slurry into refiner. After that, the slurry, thermosetting resins, thermoplastic resins, inorganic particles, inorganic binders, water, a lubricating oil and a hydrating agent are put into a vacuum nirvana for kneading as a slurry composition. Next, the kneaded slurry composition are put into a vacuum extruder and extruding a semi-finished product. After that, the semi-finished product is transferred to a deformation mechanism, using a metal mold as a setting mold, a plurality of connecting holes connecting a cavity forming surface and outside are formed on the metal mold, and upper and lower molds are used to carry out embossing and shaping. Next, carbon dioxide is blown into the connecting holes for hardening process through the inorganic binders to form a molded body. The molded body is put into an oven for drying, so as to form the runner protection tube for steel casting.

The disclosure provides a runner protection tube for steel casting and a manufacturing method thereof. The slurry composition for forming the runner protection tube for steel casting includes a cast starch as the thermosetting resin, a lubricating oil and a hydrating agent. The lubricating oil makes the runner protection tube does not stick to the kneader, extruder or other equipment after kneading. The cast starch improves the wet performance and dry strength, surface finish of the mold. The hydrating agent reduces the consistency of semi-finished products and makes them smoother when used.

To make the aforementioned more comprehensible, several embodiments accompanied with drawings are described in detail as follows.

DESCRIPTION OF THE EMBODIMENTS

Embodiments of the disclosure will be described in details below. However, these embodiments are illustrative, and the disclosure is not limited thereto.

Herein, a range indicated by "one value to another value" is a general representation which avoids enumerating all values in the range in the specification. Therefore, the description of a specific numerical range covers any numerical value within the numerical range and the smaller numerical range bounded by any numerical value within the numerical range, as if the arbitrary numerical value and the smaller numerical range are written in the specification.

The disclosure provides a runner protection tube for steel casting and a manufacturing method thereof. The runner protection tube for steel casting is made of a slurry composition for forming the runner protection tube for steel casting, the slurry composition includes organic fibers, inorganic fibers, thermosetting resins, thermoplastic resins, inorganic particles, inorganic binders, water, a lubricating oil and a hydrating agent. Based on the total weight of the slurry composition, the amount of water is, for example, 15 wt % to 40 wt %. The ingredients mentioned will be described in detail below.

<Organic Fibers>

The organic fiber of the present invention may include pulp, such as waste paper pulp, that is, waste paper and water may be prepared into pulp. Therefore, the present invention can recycle the waste paper for secondary use, which meets the requirements of environmental protection and green energy advocated by the current industry. However, the present invention is not limited thereto, and other materials can also be used, such as paper fiber, recycled fiber, wood fiber, kapok, bamboo fiber, straw, etc. Based on the total weight of the slurry composition, the amount of organic fiber is, for example, 5 wt % to 15 wt %. When the amount of organic fiber used is in the above range, the toughness of the product can be effectively improved by increasing the content of organic fiber, and it is not easy to be damaged during the molding process.

<Inorganic Fibers>

The inorganic fibers of the present invention may include ceramic fibers. Based on the total weight of the slurry composition, the amount of the inorganic fibers is, for example, 15 wt % to 25 wt %. When the usage amount of the inorganic fiber is within the above range, by reducing the usage amount of the inorganic fiber, the inorganic fiber can be prevented from adhering to the surface of human skin and irritating the skin during cutting or use. More specifically, the ceramic fibers used in the present invention are, for example, bio soluble ceramic fibers. The present invention selects the bio soluble ceramic fibers which is easier for the human body to excrete, which is a kind of biodegradable fiber. Therefore, while improving the structural strength and refractoriness of the casting runner protection tube, the present invention also takes into account the non-toxicity to the human body and the environmental friendliness. However, the present invention is not limited thereto, and other materials may also be used, such as ceramic fibers, mineral fibers, silica fibers, metal fibers, glass fibers, carbon fibers, and the like.

<Thermosetting Resins>

The thermosetting resin of the present invention may include phenolic resins and a cast starch. Based on the total weight of the slurry composition, the amount of the thermosetting resin is, for example, 5 wt % to 15 wt %. The thermosetting resin can be used as an organic binder in the manufacture of the casting runner protection tube of the present invention. Phenolic resin has a moisture-proof function, adding an appropriate amount of phenolic resin can make paper fibers moisture-proof. Therefore, the present invention uses phenolic resin as the thermosetting resin to manufacture the casting runner protection tube, which can improve the refractory temperature and moisture resistance of the casting runner protection tube. The cast starch improves the wet performance and dry strength, surface finish of the mold. The cast starch can also reduce the friction resistance between the semi-finished product and the mold, which further improves the demolding performance and anti-drying ability of the semi-finished product, facilitates demolding, and reduce the mold rejection rate caused by poor demolding.

<Thermoplastic Resins>

The thermoplastic resin of the present invention may include ethylene vinyl acetate copolymer (EVA), polyvinyl alcohol (PVA) or vinyl acetate. Based on the total weight of the slurry composition, the amount of the thermoplastic resin is, for example, 1 wt % to 10 wt %. The thermoplastic resin can be used as an organic binder and a paper strengthening agent in the manufacture of the casting runner protection tube of the present invention, which not only helps the subsequent shaping process, but also has water resistance, and has the effect of increasing the strength of the paper.

<Inorganic Particles>

The inorganic particles include a bentonite, a kaolin, a zircon powder or a chromite. Based on the total weight of the slurry composition, the amount of the inorganic particles is, for example, 20 wt % to 40 wt %. The chromite can be used as refractory material. The zircon powder is a high-quality refractory material with high refractoriness, self-sintering characteristics, and wide sintering temperature range.

<Inorganic Binders>

The inorganic binder includes sodium silicate. Based on the total weight of the slurry composition, the amount of inorganic binder is, for example, 5 wt % to 20 wt %. Sodium silicate is hardened with carbon dioxide and then heated to make it into $SiO_2$. $SiO_2$ will crystallize at high temperature during the casting process. It is a very high temperature resistant inorganic binder.

<Lubricating Oil>

The lubricating oil includes a mineral oil or a castor oil. Based on the total weight of the slurry composition, the amount of lubricating oil is, for example, 1 wt % to 10 wt %. The lubricating oil makes the runner protection tube does not stick to the kneader, extruder or other equipment after kneading.

<Hydrating Agent>

The hydrating agent includes lignosulfonate. Based on the total weight of the slurry composition, the amount of hydrating agent is, for example, 1 wt % to 10 wt %. The hydrating agent reduces the consistency of semi-finished products and makes them smoother when used.

The disclosure provides a manufacturing method of a runner protection tube for steel casting, including the following steps.

First, water, organic fibers and inorganic fibers are put into a pulper to prepare a slurry, and the slurry is put into refiner, wherein the fiber length is fully controlled at 2 mm to 4 mm. After that, the slurry, thermosetting resins, thermoplastic resins, inorganic particles, inorganic binders, water, a lubricating oil and a hydrating agent are put into a vacuum nirvana for kneading (kneading for 10 min to 20 min, vacuum condition 0.075 MPa to 0.095 MPa) as a slurry composition, and the vacuum condition is to avoid pores affecting the extruded molded body to produce pores.

Next, the kneaded slurry composition are put into a vacuum extruder (vacuum condition 0.075 MPa to 0.095 MPa) and extruding a semi-finished product on a bracket. After that, the bracket is inserted into the gap of the deformation mechanism, so that the semi-finished product is transferred to the deformation mechanism. The deformation mechanism is conducive to feeding and demolding, and the amount of deformation does not need to be too large. The gap is 0.5 mm to 1.5 mm, and the material can be loaded and demolded. A metal mold is used as a setting mold, a plurality of connecting holes connecting a cavity forming surface and outside are formed on the metal mold, and upper and lower molds are used to carry out embossing and shaping.

Next, carbon dioxide is blown into the connecting holes for hardening process through the inorganic binders ($Na_2SiO_3 + CO_2 + H_2O \rightarrow H_2SiO_3 \downarrow + Na_2CO_3$) to form a molded body. Open the mold, withdraw the shaping mechanism, withdraw the bracket, shrink, and take out the molded body. The molded body is put into an oven for drying (temperature 150° C. to 180° C., time 20 min to 60 min), so as to form the runner protection tube for steel casting.

The disclosure provides a runner protection tube for steel casting and a manufacturing method thereof. The slurry composition for forming the runner protection tube for steel casting includes a cast starch as the thermosetting resin, a lubricating oil and a hydrating agent. The lubricating oil makes the runner protection tube does not stick to the kneader, extruder or other equipment after kneading. The cast starch improves the wet performance and dry strength, surface finish of the mold. The cast starch can also reduce the friction resistance between the semi-finished product and the mold, which further improves the demolding performance of the semi-finished product, facilitates demolding, and reduce the mold rejection rate caused by poor demolding. The hydrating agent reduces the consistency of semi-finished products and makes them smoother when used.

As for the manufacturing method of the runner protection tube, the manufacturing method uses a deformation mechanism, which prevents the elastic airbag of the conventional process from being punctured by the inorganic fiber under high temperature and high pressure. Also, the manufacturing method uses carbon dioxide hardened sodium silicate to set the shape, and then uses the oven to dry with low moisture content. In addition, the manufacturing method significantly reduce water content and reduce energy consumption. On the other hand, the manufacturing method easily controls and unify the thickness by using an extruder.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A runner protection tube for steel casting, which is made of a slurry composition for forming the runner protection tube for steel casting, the slurry composition includes organic fibers, inorganic fibers, thermosetting resins, thermoplastic resins, inorganic particles, inorganic binders, water, a lubricating oil and a hydrating agent,
   wherein based on a total weight of the slurry composition, an amount of the organic fiber used is 5 wt % to 15 wt %, an amount of the inorganic fiber used is 15 wt % to 25 wt %, an amount of the thermosetting resin is 5 wt % to 15 wt %, an amount of the thermoplastic resin is 1 wt % to 10 wt %, an amount of the inorganic particles is 20 wt % to 40 wt %, an amount of the inorganic binder is 5 wt % to 20 wt %, an amount of water is 15 wt % to 40 wt %, an amount of the lubricating oil is 1 wt % to 10 wt %, and an amount of the hydrating agent is 1 wt % to 10 wt %.

2. The runner protection tube for steel casting of claim 1, wherein the organic fiber includes a pulp.

3. The runner protection tube for steel casting of claim 1, wherein the inorganic fiber includes ceramic fibers.

4. The runner protection tube for steel casting of claim 1, wherein the thermosetting resin includes phenolic resins and a cast starch.

5. The runner protection tube for steel casting of claim 1, wherein the thermoplastic resins include ethylene vinyl acetate copolymer, polyvinyl alcohol or vinyl acetate.

6. The runner protection tube for steel casting of claim 1, wherein the inorganic particles include a bentonite, a kaolin, a zircon powder or a chromite.

7. The runner protection tube for steel casting of claim 1, wherein the inorganic binder includes sodium silicate.

8. The runner protection tube for steel casting of claim 1, wherein the lubricating oil includes a mineral oil or a castor oil.

9. The runner protection tube for steel casting of claim 1, wherein the hydrating agent includes lignosulfonate.

10. A manufacturing method of a runner protection tube for steel casting of claim 1, comprising:
   putting water, organic fibers and inorganic fibers into a pulper to prepare a slurry, and putting the slurry into refiner;
   putting the slurry, thermosetting resins, thermoplastic resins, inorganic particles, inorganic binders, water, a lubricating oil and a hydrating agent into a vacuum nirvana for kneading as a slurry composition;
   putting the kneaded slurry composition into a vacuum extruder and extruding a semi-finished product;
   transferring the semi-finished product to a deformation mechanism, using a metal mold as a setting mold, forming a plurality of connecting holes connecting a cavity forming surface and outside on the metal mold, and using upper and lower molds to carry out embossing and shaping;
   blowing carbon dioxide into the connecting holes for hardening process through the inorganic binders to form a molded body; and
   putting the molded body into an oven for drying, so as to form the runner protection tube for steel casting.

* * * * *